United States Patent
Fennell et al.

(10) Patent No.: US 8,739,094 B2
(45) Date of Patent: May 27, 2014

(54) POWER ESTIMATION USING ACTIVITY INFORMATION

(75) Inventors: Martin Fennell, Iver Heath (GB); James Monthie, Fulton, MD (US); Iain Stickland, Yateley (GB)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/335,278

(22) Filed: Dec. 22, 2011

(65) Prior Publication Data

US 2013/0167098 A1    Jun. 27, 2013

(51) Int. Cl.
*G06F 17/50*    (2006.01)

(52) U.S. Cl.
USPC ............ 716/109; 716/100; 716/101; 716/106

(58) Field of Classification Search
USPC ......... 716/100–101, 106, 109, 110–112, 120, 716/132–133
See application file for complete search history.

(56) References Cited

U.S. PATENT DOCUMENTS

| | | | |
|---|---|---|---|
| 5,872,952 A * | 2/1999 | Tuan et al. ................... 714/724 |
| 6,212,665 B1 * | 4/2001 | Zarkesh et al. ............... 716/109 |
| 6,363,515 B1 | 3/2002 | Rajgopal et al. |
| 6,442,738 B1 | 8/2002 | Brehmer |
| 7,134,100 B2 | 11/2006 | Ravi et al. |
| 7,260,809 B2 | 8/2007 | Ravi et al. |
| 8,156,458 B2 * | 4/2012 | Baker et al. .................... 716/107 |
| 2007/0022395 A1 * | 1/2007 | Ravi et al. ......................... 716/5 |
| 2007/0226666 A1 * | 9/2007 | Ganai et al. ...................... 716/5 |
| 2007/0245277 A1 * | 10/2007 | Chen ................................ 716/5 |
| 2007/0245278 A1 * | 10/2007 | Chen ................................ 716/5 |
| 2007/0245285 A1 * | 10/2007 | Wang et al. ..................... 716/10 |
| 2007/0250798 A1 * | 10/2007 | Chaudhry et al. ................ 716/4 |
| 2007/0261010 A1 * | 11/2007 | Levy ................................ 716/1 |
| 2007/0277144 A1 * | 11/2007 | Veller et al. .................... 716/18 |
| 2008/0092092 A1 * | 4/2008 | Dalton et al. .................... 716/4 |
| 2008/0098340 A1 * | 4/2008 | Oh ................................... 716/8 |
| 2008/0263486 A1 * | 10/2008 | Alexanian et al. ............... 716/5 |
| 2009/0031268 A1 * | 1/2009 | Miranda et al. .................. 716/6 |
| 2009/0327980 A1 * | 12/2009 | Melamed-Kohen et al. ..... 716/2 |
| 2010/0192115 A1 * | 7/2010 | Yang et al. ....................... 716/5 |
| 2011/0072406 A1 * | 3/2011 | Chaudhry et al. ............ 716/120 |
| 2011/0276929 A1 * | 11/2011 | Imai .............................. 716/102 |
| 2012/0005640 A1 * | 1/2012 | Mehta ........................... 716/106 |
| 2012/0017188 A1 * | 1/2012 | Lepak et al. .................. 716/109 |
| 2012/0216160 A1 * | 8/2012 | Buechner et al. ............. 716/109 |

OTHER PUBLICATIONS

"Register-Transfer Level," Wikipedia, http://en.wikipedia.org/siki/Register_transfer_level, Aug. 14, 2011, pp. 1-3.

\* cited by examiner

*Primary Examiner* — Stacy Whitmore (57) ABSTRACT

A method of estimating power consumption of an electronic device is performed by a processing device. The estimating includes estimating a power consumption of a gate-level implementation of an electronic device design. The estimating further includes independently calculating for each of a plurality of implementation-invariant nodes of the design an incremental power dissipation associated with that node.

24 Claims, 9 Drawing Sheets

POWER ESTIMATION USING ACTIVITY INFORMATION

TECHNICAL FIELD

This application is directed, in general, to systems and methods for electronic design automation.

BACKGROUND

An integrated circuit (IC) typically includes numerous connections between electrical components. These connections are often designed with the assistance of an electronic design automation (EDA) tool. The EDA tool typically includes software instructions operating on an engineering workstation to provide visualization of the IC design. A design engineer manipulates modular design cells from a cell library to build up a design database. An autorouter within the EDA tool determines the connection paths between the design cells. When the design layout is complete, the layout data are used in a pattern generation (PG) step that generates pattern data suitable to produce a set of pattern masks used in photolithographic steps of an IC manufacturing process.

Before the PG step, the designer may perform a gate-level simulation of the IC design and estimate the power consumption of the IC from simulated activity on the IC. If the estimate exceeds a design objective, the designer may revise the design database to reduce the power consumption locally or globally as needed to meet the relevant design objective. The designer may again perform a gate-level simulation to determine if the revised design meets the design objective. This revision cycle consumes significant time, as the gate-level simulation of even a moderately complex IC design may require significant time and computational resources.

SUMMARY

One aspect provides a method of estimating power consumption of an electronic device. The estimating includes employing a computing device to estimate the power consumption of a gate-level implementation of an electronic device design. The estimating further includes independently calculating for each of a plurality of implementation-invariant nodes of the design an incremental power dissipation associated with that node.

Another aspect provides a computer program product. The computer program product includes a computer readable medium having a series of operating instructions embodied therein. The series of operating instructions is adapted to be executed to implement a method of estimating power consumption of an electronic device. The method includes estimating a power consumption of a gate-level implementation of an electronic device design. The estimating further includes independently calculating for each of a plurality of implementation-invariant nodes of the design an incremental power dissipation associated with that node.

Yet another aspect provides an electronic device design power estimation system. The estimation system includes an electronic design automation tool and a power estimation module. The power estimation module is configured to receive from the electronic design automation tool an electronic device design. The power estimation module is further configured to estimate a power consumption of a gate-level implementation of the design. The estimating includes independently calculating for each of a plurality of implementation-invariant nodes of the design an incremental power dissipation associated with that node.

BRIEF DESCRIPTION

Reference is now made to the following descriptions taken in conjunction with the accompanying drawings, in which.

DETAILED DESCRIPTION

Embodiments of methods and systems described herein provide an innovative technique to estimate the power consumed by a candidate design for an electronic device, e.g. an integrated circuit (IC). In various embodiments signal transition ("activity") data are determined from a register-transfer level (RTL) description of the design at implementation-invariant nodes. The activity data are coupled with a back-annotated description of the design. Power consumption metrics for the design are determined, allowing the design to be modified at an earlier stage in the IC design cycle, e.g. prior to a full gate-level simulation, than is provided by conventional power estimation methods. By identifying noncompliant regions of the design without performing a full closed-timing analysis, embodiments provide for bypassing costly gate-level simulations while providing guidance to the designer that is sufficient to produce a useful estimate of power consumption of the candidate design.

Figure 1:
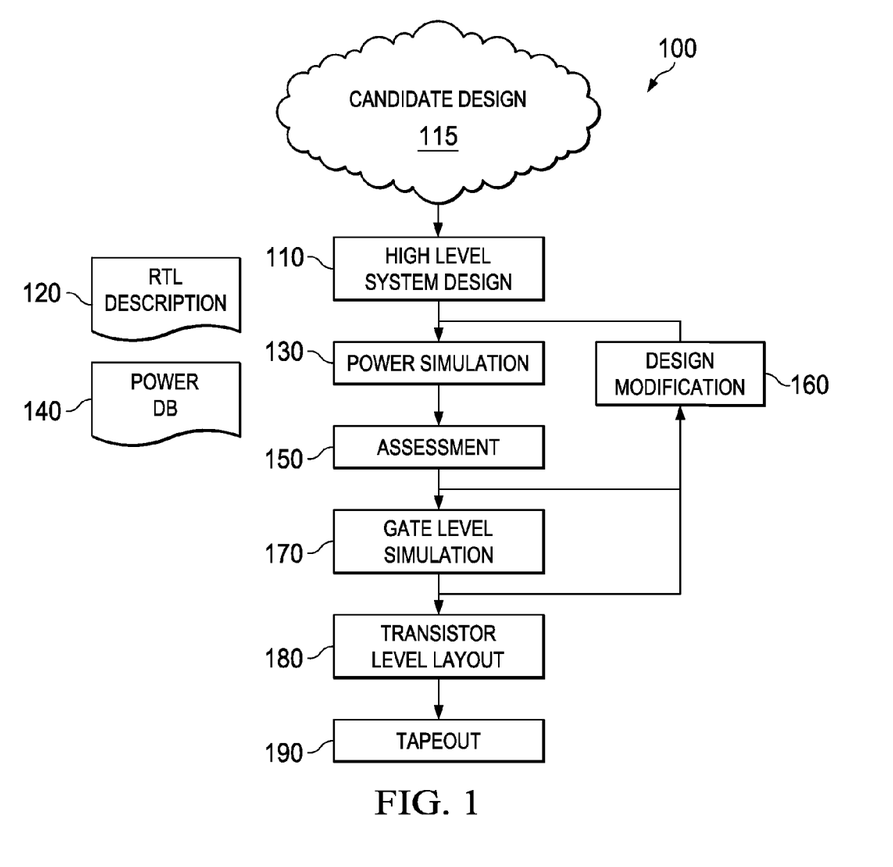
FIG. 1 illustrates a method of designing an electronic device, e.g. an integrated circuit, according to one embodiment, including a power simulator module.

FIG. 1 presents without limitation a method 100 of designing an electronic device, e.g. an integrated circuit, viewed at a high level of abstraction. In a design module 110, a high-level candidate design 115 of an electronic device is rendered in a hardware description language (HDL) such as register transfer level (RTL) format, e.g. implemented in Verilog® or VHDL languages. Those skilled in the art will appreciate that in RTL a circuit's behavior is defined in terms of the flow of signals (e.g. transfer of data) between implementation-invariant nodes, e.g. hardware registers, and the logical operations performed on those signals between the implementation-invariant nodes. In the illustrated embodiment the design module 110 produces a design database, e.g. an RTL description database 120 that describes the operation of the candidate design 115 in a register transfer layer space.

A power simulation module 130 receives the RTL description database 120 and estimates a metric that characterizes power consumption of the candidate design 115 and provides a power consumption database 140. The power simulation module 130 and the power consumption database 140 are described in greater detail below.

In an assessment module 150 the power estimate from the power consumption database 140 is assessed for compliance with one or more design criteria, such as total time-average power consumption, peak instantaneous power consumption, and/or total power consumption within one or more implementation-invariant nodes of the design. If the assessment module 150 determines that the candidate design 115 is noncompliant with one or more design criteria, the candidate design 115 may be modified in a design modification step 160 to correct the source(s) of the noncompliant power consumption. The power estimation may then be repeated if desired to determine a new power estimate.

After the candidate design 115 is determined by the assessment module 150 to comply with applicable power consumption criteria, the method 100 proceeds to a gate-level simulation module 170. The simulation module 170, which may be conventional, may provide a gate-level power estimate. This power estimate in some cases may determine that the power consumption of the candidate design 115 is noncompliant notwithstanding the prediction by the power simulation module 130. In such cases, the design 115 may again be modified in the step 160 to correct any sources of noncompliance. However, such "false negatives" by the power simulation module 130 are expected to be infrequent enough that the early screening provided by the method 100 will result in an overall increase in design productivity. Moreover, the simulation module 170 may in some cases determine that one or more logic or timing errors in the candidate design 115 require correction, notwithstanding the power estimate. When this is the case, the RTL description may be modified to correct both the logic error and any noncompliant power consumption.

Once the candidate design 115 complies with the power consumption criteria as determined by both the assessment module 150 and the simulation module 170, the method 100 proceeds to a transistor-level layout module 180 and a tapeout module 190 in which the candidate design 115 is rendered in a design database suitable for pattern generation. The modules 180 and 190 may be conventional.

The functions referred to herein, e.g. with respect to FIG. 1, may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes and, optionally, on multiple computers. Moreover, alternative embodiments may combine multiple instances of a particular module or sub-module. Furthermore, those skilled in the art will recognize that the functions described in example embodiments are for illustration only. Operations may be combined or the functionality of the functions may be distributed in additional functions in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Figure 2:
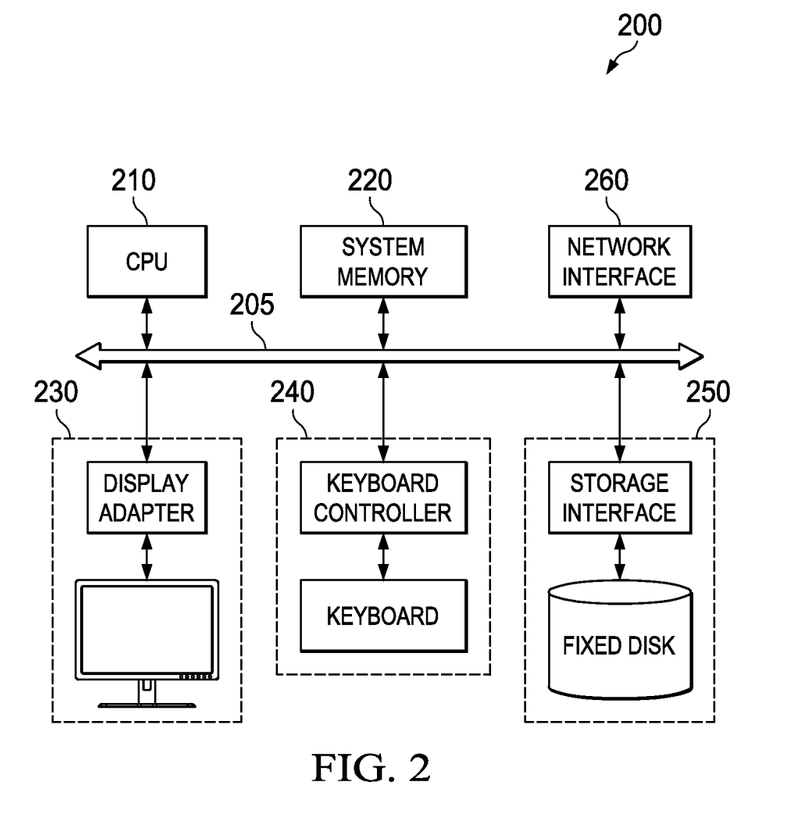
FIG. 2 depicts a block diagram of a computer system suitable for implementing the method of FIG. 1.

Each of the blocks of the method 100 may be executed in whole or in part by a functional module, e.g. a software module or hardware module, or a portion of a module, or a computer system user using a computer system or electronic design automation tool, e.g. a design workstation, such as a computer system 200, described below. Thus, the method 100, the functions thereof and modules therefore may be executed on a computer system configured to execute the functions of the method 100 and/or may be executed from computer-readable media. The method 100 may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as flash memory, EEPROM, EPROM, ROM or application-specific integrated circuits (ASICs), volatile storage media including registers, buffers or caches, main memory, RAM and the like, and data transmission media including computer network, point-to-point telecommunication and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

FIG. 2 depicts a block diagram of a computer system 200 suitable for implementing the invention. The computer system may be an electronic design automation tool, e.g. a design workstation. While not limited to any particular type of computer system, it may be preferable that the computer system 200 be capable of running a design and verification tool set such as the Cadence® System Development Suite, the Synopsys® Galaxy® Design Platform, or a similar development tool.

The computer system 200 includes a bus 205 that interconnects major subsystems of the computer system 200. The number and type of subsystems connected to the bus 205 is not limited to any particular number and type. In an illustrative and nonlimiting embodiment the computer system 200 includes a central processor unit (CPU) 210, a system memory 220, a display 230 and display adapter, a keyboard 240 and keyboard adapter, a fixed disk 250 and storage interface, and a network interface 260. In a nonlimiting embodiment the computer system 200 is a UNIX™ workstation.

The computer system 200 is configured to store operating instructions, e.g. on the fixed disk 250, that implement one or more embodiments of the disclosure. The instructions may be contained in, e.g. a standalone program or a subroutine. Additionally, operating instructions may be received by the CPU 210 via electronic signals received via the network interface 260.

In some cases the computer system 200 is optimized for circuit design activities, and may include the capability to visualize the candidate design 115, such as by an EDA tool. Without limitation, an example of such a platform and tool is a UNIX-based engineering workstation running the IC Compiler tool from Synopsys, Inc., Mountain View, Calif., USA. The various modules described herein may be linked to or invoked by other software operating on the computer system 200 by, e.g. a subroutine call or application programming interface (API).

Figure 3:
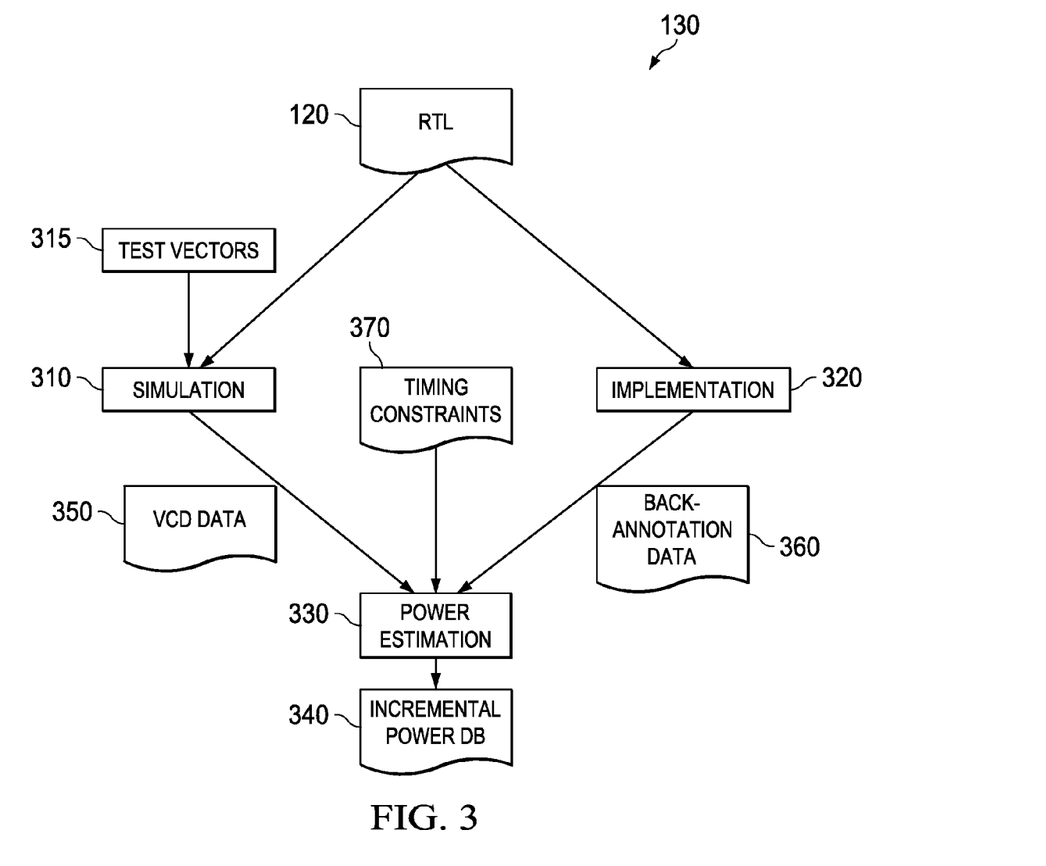
FIG. 3 illustrates the power simulator module of FIG. 1 in one illustrative embodiment, in which a design simulation module operates in parallel with an RTL implementation module, and a power estimation module operates on the outputs of the design simulation module and the RTL implementation module.

FIG. 3 illustrates the power simulation module 130 in greater detail in an illustrative and nonlimiting embodiment. The module 130 performs the power simulation using two, parallel computation paths. A first path includes an activity simulation module 310, and a second path includes an implementation module 320. Thus in the illustrated embodiment the modules 310 and 320 may operate in parallel. Such parallel operation, while desirable in many cases, is not required. Thus, in other embodiments, not shown, the simulation module 310 and the implementation module 320 are executed sequentially.

Each of the modules 310, 320 receives the RTL description database 120 as input, and each of the modules 310, 320 provides output to a power estimation module 330. The activity simulation module 310 produces as output a value change dump (VCD) file 350, the implementation module 320 produces as output a back-annotation database 360, and the power estimation module 330 stores estimated power values in the power consumption database 140.

The activity simulation module 310 simulates the activity of the candidate design 115 in accordance with the RTL description database 120 and test vectors 315 to determine state changes at implementation-invariant nodes in the candidate design 115. The state changes are captured in the VCD file 350. The activity simulation module 310 determines the state of at least some and preferably all of the implementation-invariant nodes of the candidate design 115 at each of a number of time increments. For example, the activity simulation module 310 may operate the candidate design 115 in a simulation space for each of a number of the test vectors 315. The activity simulation module 310 then captures the state at implementation-invariant nodes at each of a number of cycles of the simulation clock.

Figure 4A:
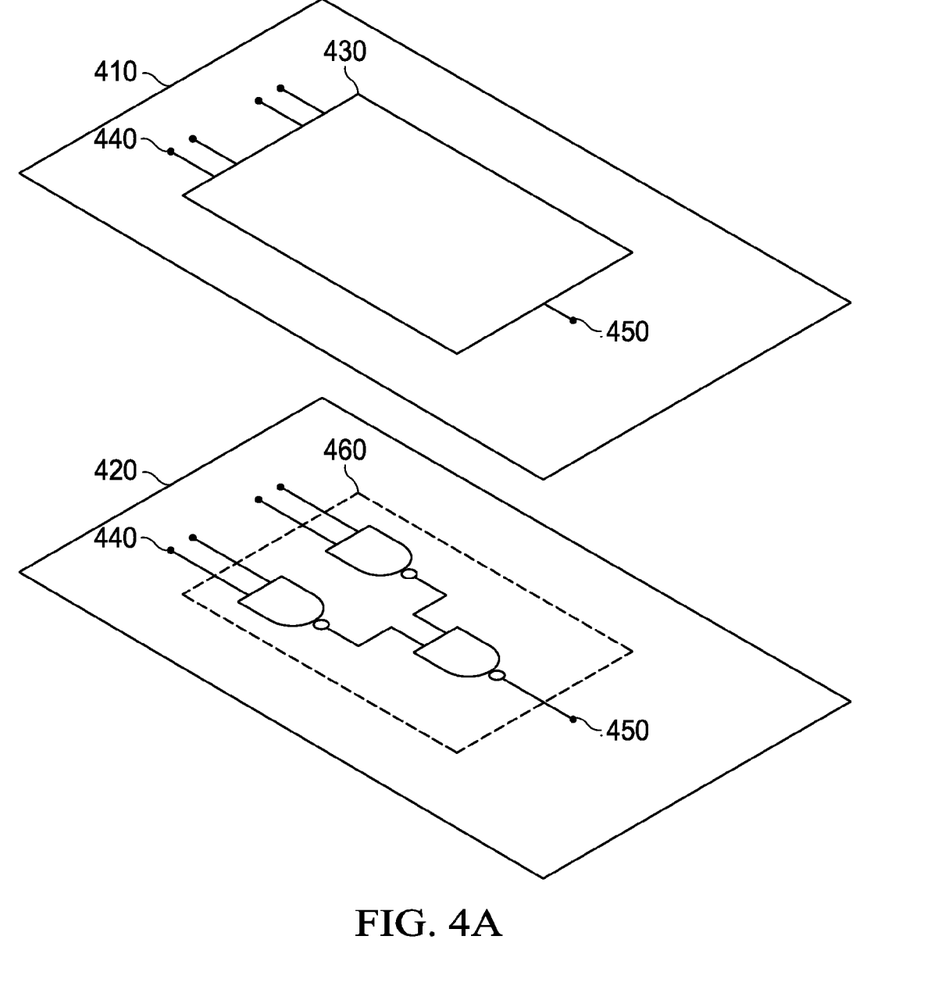
FIG. 4A illustrates an RTL layer and a gate-level layer of an electronic device design, including implementation-invariant nodes common to both layers.

FIG. 4A schematically illustrates the concept of implementation invariant nodes. An RTL-level layer 410 and a gate-level layer 420 are each representative of a same portion of the candidate design 115. The RTL-level layer 410 is described by a design block 430. The design block 430 is functionally defined in the RTL description database 120. The design block 430 has a number of inputs 440, four in this example, and an output 450. The gate-level layer 420 includes a number of gate-level elements, three NAND gates in this example. A logic cone 460 encompasses the gate-level elements. As used herein a logic cone refers to an abstraction of a span of logic that includes multiple inputs fanning into a single output. The inputs 440 and output 450 retain their identity in the gate-level layer 420.

The gate-level elements are determined by the implementation module 320 from the functional description of the design block 430. Depending on specific design choices the elements determined by the implementation module 320 may differ from one to another particular candidate design 115. However, the inputs 440 and the output 450 are invariant between different implementations of the logic within the logic cone 460. Moreover, inputs to and outputs from any registers or latches inferred in the RTL implementation are also included in the set of implementation-invariant nodes.

Returning to FIG. 3, the implementation module 320 operates to render the candidate design 115 at a physical (e.g. gate) layer from which physical parameters such as propagation delays may be determined. Implementation may include, e.g. selecting combinations of gates, and connections between the gates, that provide the function of each design block in the RTL description database 120. The module 320 produces as output the back-annotation database 360 that captures such physical parameters.

The back-annotation database 360 includes back-annotation data, e.g. parametric data determined from a physical implementation of the candidate design 115 that affects the timing of signals in the simulation space. The back-annotation data may include, e.g. input ramptime, output loading and gate delays for functional cells in the candidate design 115. These data may be generated, e.g. by an EDA tool such as the aforementioned Synopsys tool.

In the illustrated embodiment the implementation module 320 operates in parallel with the simulation module 310, but is not limited to such operation. The implementation module 320 may be executed on a same or a different computing platform as the simulation module 310, e.g. on the computer system 200. It may preferred, however, to execute the simulation module 310 and the implementation module 320 on separate computing platforms to allow simultaneous operation to reduce the total time needed to prepare the inputs to the power estimation module 330. In some embodiments, a first computing platform is optimized for executing the simulation module 310, while a second computing platform is optimized for executing the implementation module 320. Optimization may include, e.g. appropriate selection of processor speed and architecture, and selection of memory configuration.

The power estimation module 330 operates to associate each implementation-invariant node of the candidate design 115 with activity data from the VCD file 350 and back-annotation data from the back-annotation database 360 relevant to that node. The power associated with the transitions at each node may then be computed using well-known physical relationships. The module 330 may compute the power dissipation for each node at each time increment of the simulation. Advantageously, in some embodiments as described further below the power estimation module 330 streamlines the power calculation by computing the estimated power at each implementation-independent node only once.

However, the power may be overestimated in some cases by including simulated transitions that are unlikely to occur in actual operation of the candidate design 115. To reduce such overestimation, a timing constraints database 370 provides timing data that may be used by the power estimation module 330 to modify the treatment of events at implementation-invariant nodes. For example, some events that would otherwise be included in a power estimate may be disregarded when the timing data indicate that event would not propagate within the circuit.

Figure 5A:
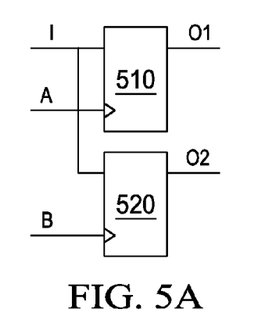
FIGS. 5A-5D illustrate aspects of timing constraints that may be used by the power simulator of FIG. 3 to apply a secondary filter on a power estimate.

This aspect is described further with reference to FIGS. 5A-5D, which present illustrative and nonlimiting examples of several timing scenarios. FIG. 5A illustrates a hypothetical design block including latches 510, 520. The latch 510 receives a clock A at its clock input, and the latch 520 receives a clock B at its clock input. Both latches 510, 520 receive an input signal I at their respective data inputs. The latch 510 produces a signal output O1, and the latch 520 produces a signal output O2.

Figure 5B:
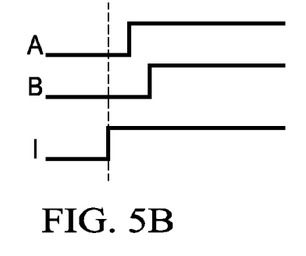
Figure 5C:
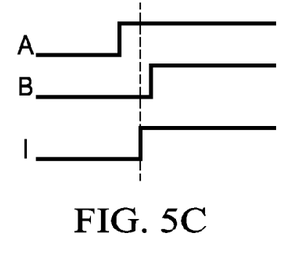
Figure 5D:
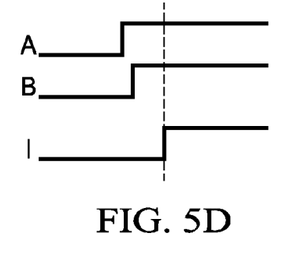

In FIGS. 5B-5D, the input signal transitions from zero to one, and the clock A leads the clock B by, e.g. 10 ns. In FIG. 5B, the input I leads both the clocks A and B. In this case the output signals O1 and O2 both record a change of state triggered by their respective clocks. In FIG. 5C, the input I leads the clock B, but lags the clock A. In this case the output O2 records a state change, while the output O1 does not. In the case of FIG. 5D, the input I lags both the clocks A and B. In this case, neither of the outputs O1 and O2 records a state change. The incremental power associated with each of these cases is different.

In this example, the timing constraints database 370 in the case of FIG. 5B would not include an entry to disregard either of the state changes at O1 or O2. In the case of the example of FIG. 5C, the timing constraints database 370 may include an entry interpreted by the power estimation module 330 to disregard a state transition at the output O1 that might otherwise be predicted to occur by the simulation module 310. In the case of the example of FIG. 5D the timing constraints database 370 may include entries directing the power estimation module 330 to disregard state transitions at both of the outputs O1 and O2 that might otherwise be predicted to occur by the simulation module 310.

Figure 4B:
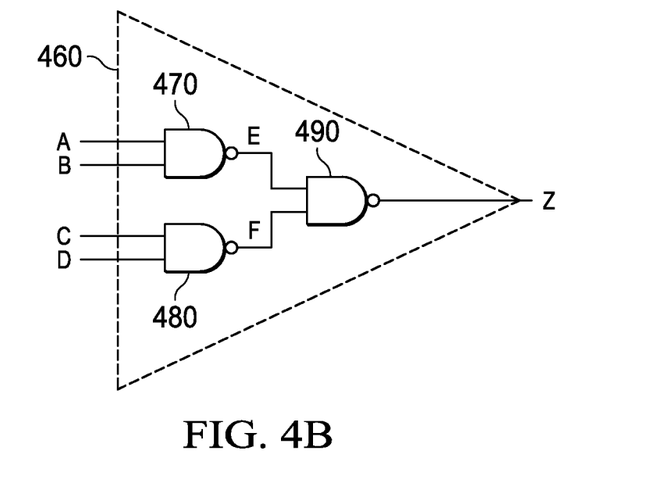
FIG. 4B illustrates a logic cone including the gates of the gate-level layer of FIG. 4A.

FIG. 4B and Table I below illustrate aspects of determining a state change at implementation-invariant nodes, e.g. the inputs 440. FIG. 4B illustrates the gates of the design block 430 in a convenient format for discussion of state transitions. The design block 430 may be viewed as a logic cone 460.

For each logic cone, the activity of any part of the cone can be derived from one or more of the following:

1) The activity at the implementation-invariant inputs of the logic cone;

2) The timing information defining the clocks and timing for implementation-invariant points;

3) The logic function of the gates in the cone, e.g. as defined in the back-annotation database 360;

4) The connectivity of the gates in the cone, e.g. as defined in the back-annotation database 360; and 5) The timing of signals propagating through the logic cone, e.g. as defined in the back-annotation database 360.

A logic cone may be of any size. However, the larger the logic cone, the less likely it will be to observe multiple occurrences of a state change at the output for a particular combination of inputs. The value of the methods and systems described herein may be greater for those cases in which multiple instances of a combination of state changes are observed, so the previously described computational benefit may be realized. However, if logic cones used in the simulation are too small, then the power computation may be dominated by too many small blocks. A balance is therefore desirable between the size and the number of logic cones used in the simulation. This balance will typically be design-dependent and resource-dependent.

Once the logic cones are established, the power estimation module 330 may calculate the incremental power dissipation of the logic cones selected to represent the candidate design 115. The incremental power calculation of each logic cone may be performed independently of the calculation power calculation of the remaining logic cones. These values may if desired be independently calculated on N computing platforms operating in parallel, thus reducing the computation time of the power estimation by about 1/N. In this manner, the design activity represented by the modules 130 and 150 and the step 160 may be performed with a manageable cycle time, providing for rapid refinement of the power consumption characteristics of the candidate design 115.

Herein, with respect to calculated power of a logic cone, "independently calculated" means that each power calculation may be performed independently of other logic cones, e.g. on different computing platforms, or in a manner in which the power calculation with respect to one logic cone does not depend on the input or output of any other logic cones.

In effect the power simulation module 130 performs a gate-level simulation on each logic cone. However, in contrast with conventional practice, the gate-level simulations of multiple logic cones are performed independently, making the power simulation easily scalable to use with multiple computing platforms. In another aspect, the candidate design 115 does not need to be timing closed because the candidate design 115 has been split into the individual logic cones, with the inputs to the cones defined by the input activity information. Moreover, once the power for a particular state change has been calculated, it does not need to be recalculated. For example, the input activity information for a logic cone may be transformed into an algebraic relationship weighting the power dissipation associated with each state change by the number of times that state change is encountered in the simulation. This aspect obviates the need for redundant computation of the power dissipation of a state change that has already been encountered in the simulation, significantly reducing computational time and resources.

FIG. 4B includes two NAND gates 470, 480 with inputs A, B, C and D. The output of the NAND gates 470, 480 are respectively E=$\overline{AB}$ and F=$\overline{CD}$. A NAND gate 490 receives E and F as inputs and outputs Z=$\overline{EF}$. For the inputs A, B, C and D as shown in Table I, the corresponding outputs at E, F and Z result. The outputs E and Z undergo five state changes, while the output F is constant TRUE (logical 1). These state changes may be used to compute an incremental power consumption attributable to the logic cone 460, e.g. the NAND gates 470, 480 and 490.

TABLE I

|  | A | B | C | D | E ($\overline{AB}$) | F ($\overline{CD}$) | Z |
|---|---|---|---|---|---|---|---|
| $T_0$ | 0 | 1 | 1 | 0 | 1 | 1 | 0 |
| $T_1$ | 1 | 1 | 0 | 0 | 0 | 1 | 1 |
| $T_2$ | 0 | 1 | 1 | 0 | 1 | 1 | 0 |
| $T_3$ | 1 | 1 | 0 | 0 | 0 | 1 | 1 |
| $T_4$ | 0 | 1 | 1 | 0 | 1 | 1 | 0 |
| $T_5$ | 1 | 1 | 0 | 0 | 0 | 1 | 1 |

With continuing reference to Table I and FIG. 4B, an example of power computation for the logic cone 460 is described without limitation to any particular logic configuration. Those skilled in the art will appreciate that the principles embodied in the described example may be applied to logic cones of any number or size.

The power dissipated by the candidate design 115 is expected to be dominated by switching losses when the design in implemented in CMOS. Thus, the power dissipated by each of the NAND gates 470, 480 and 490 may be computed at each unique combination of state transitions of the E, F and Z outputs at each of a series of time increments in a design simulation.

First the transition from $T_0$ to $T_1$ is considered. The E output switches from 1→0, F is a constant 1, and Z switches from 0→1. The E output will switch at $T_1$ plus the gate delay of the gate 470. The Z output will switch at $T_1$ plus the gate delay of the gate 470 and the gate delay of the gate 490. The standard cells are characterized for power based on input ramptime and output loading. Because this is the first time this combination of state transitions has been encountered in the logic cone 460, the power consumption of the gates 470 and 490 is retrieved from the standard cell library based on the unique combination of output loading and input ramptime of these standard cells. The total power consumption of the gates 470 and 490 represents the incremental power dissipated by the logic cone 460 for the $T_0$→$T_1$ state transition. This value is stored in the power estimate database 340, mapped to the combination of state transitions at inputs A, B, C and D, and the state transition at output Z.

At the transition $T_1$-$T_2$, the E output switches from 0→1, and Z switches from 1→0. The E output will switch at $T_2$ plus the gate delay of the gate 470. The Z output will switch at $T_2$ plus the gate delay of the gate 470 and the gate delay of the gate 490. Again, this combination of state transitions has not been previously encountered in this time increment, so the power consumption of the gates 470 and 490 is retrieved from the standard cell library based on the unique combination of output loading and input ramptime of these standard cells. The total power dissipated by the gates 470 and 490 for this state transition is again stored in the power estimate database 340, mapped to the unique combination of state transitions at inputs A-D and the output Z.

At the transition $T_2$-$T_3$, E again switches from 1→0, and Z again switches from 0→1. The E output will switch at $T_3$ plus the gate delay of the gate 470. The Z output will switch at $T_3$ plus the gate delay of the gate 470 and the gate delay of the gate 490. The power for this state transition has already been calculated for the $T_0$→$T_1$ transition, and was stored in the power estimate database 340. Thus, for this state transition, the power consumption of the logic cone 460 can be retrieved from the power estimate database 340 using the transitions at inputs A-D and the output Z. Thus, the computation of the incremental power of the logic cone 460 is bypassed for the $T_2$-$T_3$ transition, saving computational resources.

Figure 6:
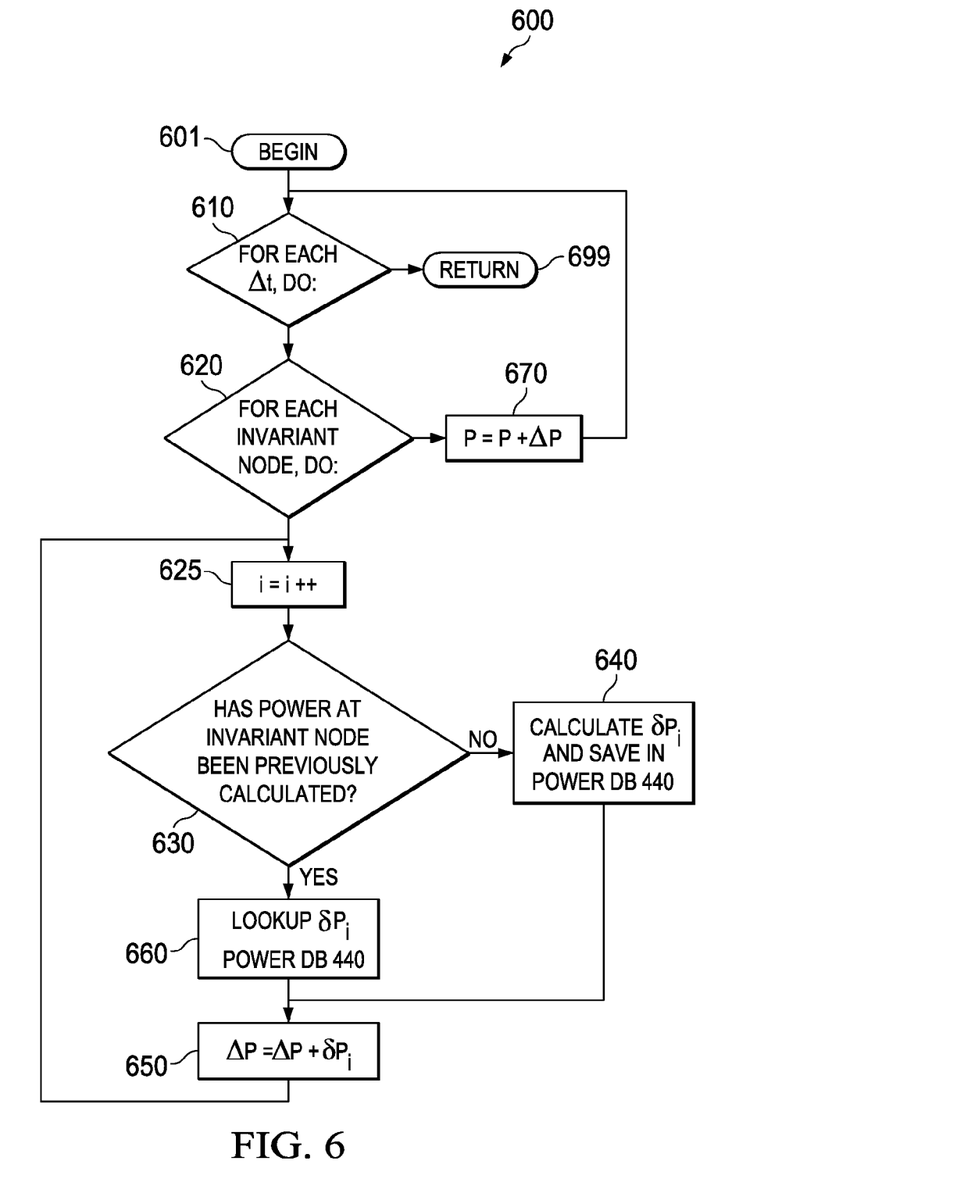
FIG. 6 illustrates an embodiment of a method of estimating power metrics associated with a candidate design of the electronic device wherein the method may be performed by the power estimation module of FIG. 3.

FIG. 6 illustrates the operation of the power estimation module 330 in an illustrative and nonlimiting embodiment. A method 600 estimates power of the candidate design 115, extending the principles described in the preceding example. The method 600 begins with an entry point 601 that may be reached by, e.g. a subroutine call or API call. The steps of the method 600 may be performed in some embodiments in an order other than the illustrated order. Without limitation the method 600 may be performed by the computer system 200.

A decisional step 610 begins a DO loop that operates over time increments Δt in the design simulation. The time increments may be of any length, but may preferably correspond to a period of the highest frequency clock of the candidate design 115. For each Δt the method 600 proceeds to a decisional step 620. The step 620 begins a DO loop that operates over each implementation-invariant node of the candidate design 115, e.g. the inputs 440. For each node, the method 600 increments a loop counter i in a step 625 and proceeds to a decisional step 630.

In the step 630 the method 600 determines if the power associated with the implementation-invariant node, designated $\delta P_i$, has been previously computed. If $\delta P_i$ has not been previously computed, the method 600 advances to a step 640. In the step 640, the method 600 computes $\delta P_i$ and saves the result in the power estimate database 340 as previously described. In a step 650 the method 600 adds $\delta P_i$ to a value ΔP that represents the total power over all the implementation-invariant nodes of the candidate design 115. The method 600 then loops back to the step 625 to increment the loop counter and repeat the loop for the next implementation-invariant node.

At the step 630, if the method determines that the power at current implementation-invariant node has been previously calculated, the method 600 bypasses the power calculation for that node. The method 600 proceeds instead to a step 660 in which $\delta P_i$ is retrieved from the power estimate database 340. Retrieving the previously stored value of the incremental power at that node avoids expending the computation resources and time that would otherwise be needed to recalculate $\delta P_i$. The method 600 then advances to the step 640 to accumulate the incremental power as previously described.

After completing the calculation of ΔP at the current value of Δt, the method exits the ΔP loop at 620 and advances to a step 670. At the step 670, the method accumulates ΔP in a total estimated power P and returns to the step 610. The method then repeats the Δt loop for the remaining time increments of the model.

After the estimated power is computed for the last time increment, the Δt loop at 610 and returns to the caller via 699.

Figure 7:
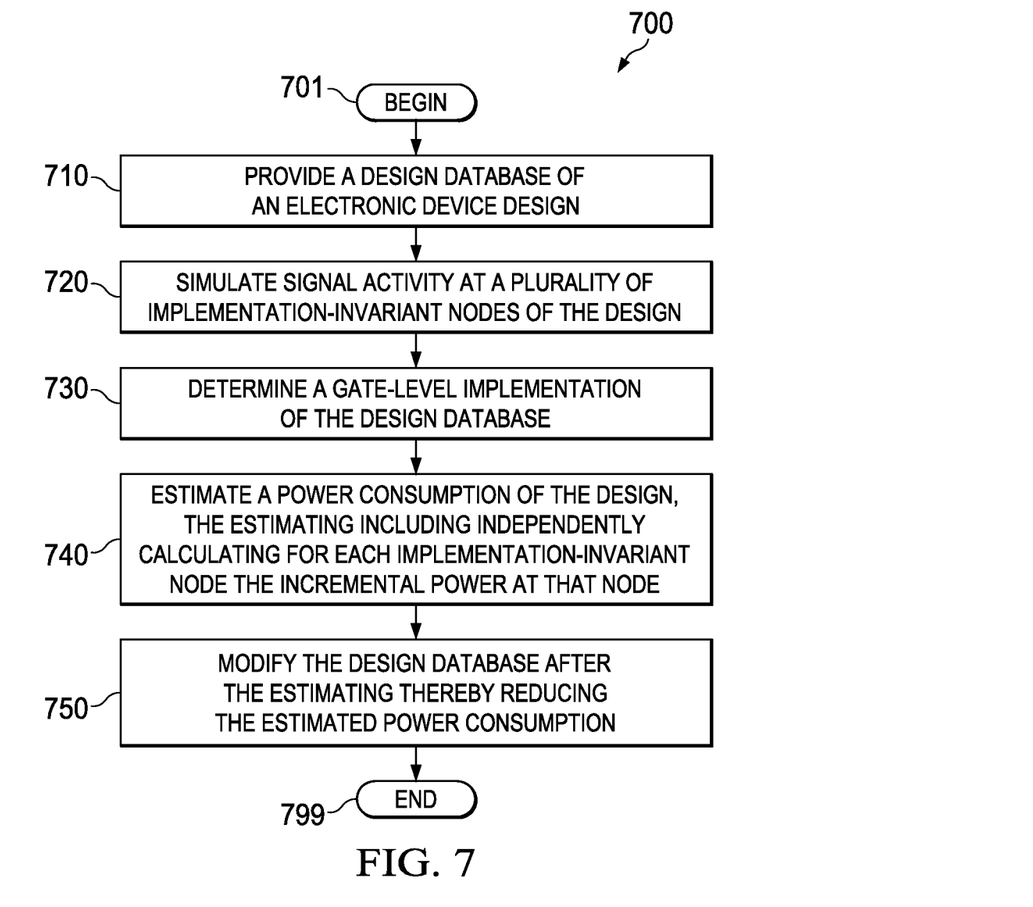
FIGS. 7 and 8 illustrate embodiments of two methods of estimating the power of an electronic device design, implementing features described by FIGS. 1, 3, 4A-B, 5A-D and 6.
Figure 8:
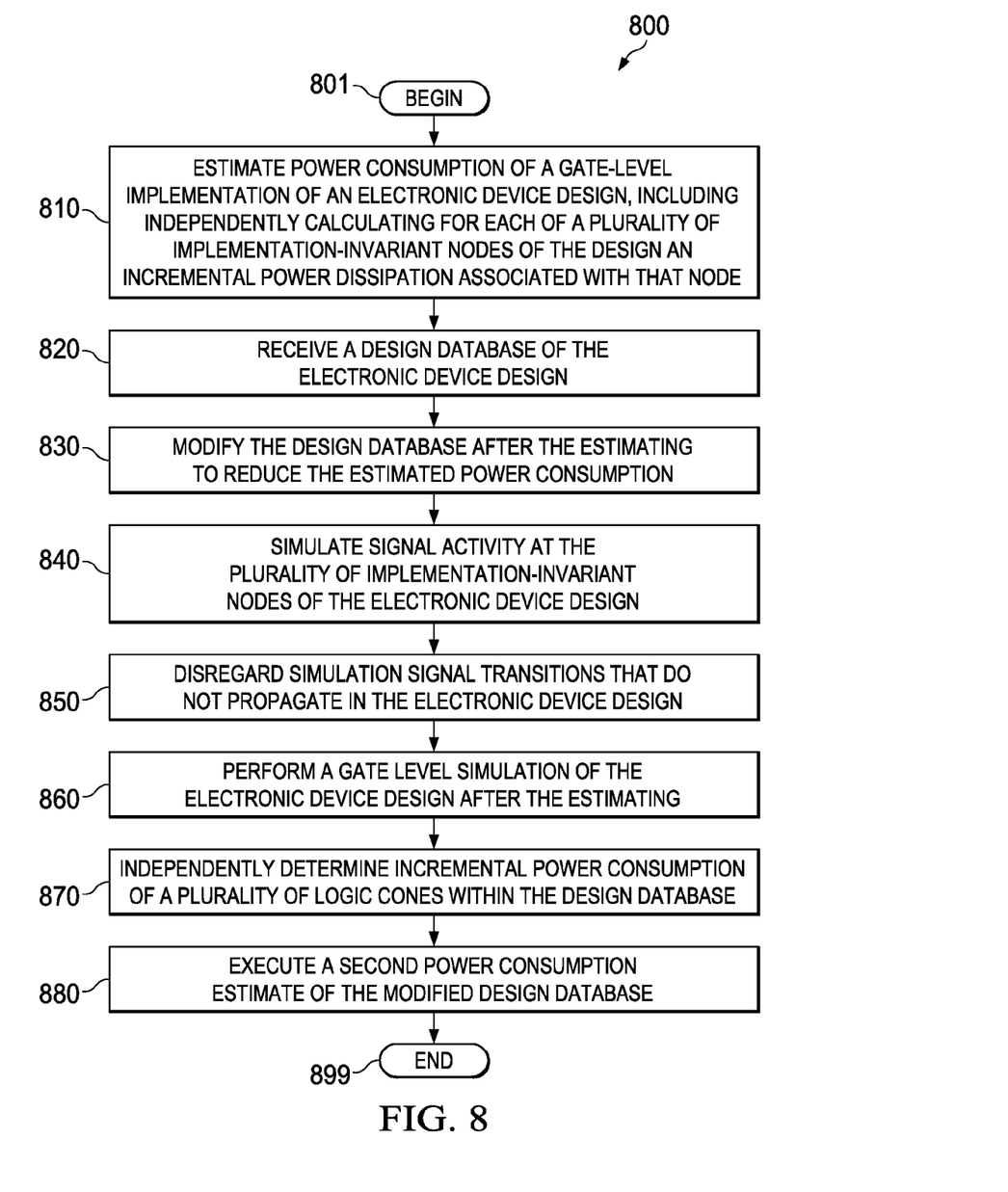

FIGS. 7 and 8 present an illustrative methods 700 and 800, e.g. of estimating power consumption of an electronic device design. The methods 700 and 800 are described with reference to features described in FIGS. 1, 2, 3, 4A-B, 5A-B and 6, without limitation thereto. Steps of each of the methods 700 and 800 may be performed in an order other than the illustrated order. The methods 700 and 800 may each include steps other than those shown, or some steps shown may not be performed. Moreover, aspects of the steps may be apportioned differently between steps without departing from the scope of the disclosure.

Referring first to FIG. 7, the method 700 begins with an entry step 701, which may be reached, e.g. from a calling routine or an application programming interface (API) call. In a step 710, a design database, e.g. the register transfer level description 120, is received of an electronic device design, e.g. the RTL database 120. In a step 720, signal activity is simulated, e.g. by the simulation module 310 at a plurality of implementation-invariant nodes of the design, e.g. the nodes 440 and 450. In a step 730 a gate-level implementation is determined of the design database, e.g. by the implementation module 320. In a step 740 a power consumption of the design is estimated, e.g. by the power estimation module 330. The estimating includes independently calculating for each implementation-invariant node the incremental power dissipation at that node. In a step 750, the design database is modified after the estimating, thereby reducing the estimated power consumption of the electronic device design. The method ends at 799, e.g. returning to a calling program.

In the above-described embodiment of the method 700, incremental power consumption of a plurality of logic cones within the RTL database may be separately determined. In such embodiments the determining may include calculating incremental power consumption of a first subset of logic cones of the design on a first computing platform, and further calculating incremental power consumption of a second subset of logic cones of the design on a second computing platform.

In any of the above-described embodiments, the method 700 may include creating a database of incremental power consumption associated with a plurality of logic cones within the RTL database. In such embodiments the incremental power consumption of each logic cone may be indexed by a pattern of state transitions at inputs and outputs of the logic cones. In such embodiments the incremental power associated with a particular logic cone may be retrieved from the database, e.g. by indexing the database with a state transition pattern corresponding to the desired power estimate.

In any of the above-described embodiments the method 700 may be implemented as an API of an electronic design automation tool.

In any of the above-described embodiments another power consumption estimate may be performed after modifying the RTL database based on a previous power consumption estimate.

In any of the above-described embodiments a gate-level simulation of the electronic device design may be performed, e.g. by the gate-level simulation module 170, after the power estimate is complete.

The method 700 ends at a step 799, e.g. a return to a calling program.

Referring next to FIG. 8, the method 800 begins with an entry step 801, which also may be reached, e.g. from a calling routine or an API call. In a step 810 a power consumption is estimated of a gate-level implementation of an electronic device design. The estimating includes independently calculating for each of a plurality of implementation-invariant nodes of the design an incremental power dissipation associated with that node.

The above-described embodiment of the method 800 may further include steps 820 and 830. In the step 820 a design database, e.g. the RTL database 120, of the electronic device design is received. In the step 830 the design database is modified after computing the estimate to reduce the estimated power consumption.

In any of the above-described embodiments of the method 800 the estimating may include a step 840 in which signal activity is simulated at the plurality of implementation-invariant nodes of the electronic device design. Such embodiments may include a step 850 in which the estimating further includes disregarding simulation signal transitions that do not propagate in the electronic device design.

The above-described embodiments of the method 800 may include a step 860 in which a gate level simulation is performed of the electronic device design after computing the estimate.

The above-described embodiments of the method 800 may include a step 870 in which incremental power consumption is independently determined for a plurality of logic cones within the design database.

The above-described embodiments of the method 800 may include a step 880 in which a second power consumption estimate is executed of the modified design database.

In any of the above-described embodiments of the method 800 the method may be implemented as an application programming interface of an electronic design automation tool.

The method 800 ends at a step 899, e.g. a return to a calling program.

Those skilled in the art to which this application relates will appreciate that other and further additions, deletions, substitutions and modifications may be made to the described embodiments.

What is claimed is:

1. A method of estimating power consumption of an electronic device, comprising:
   estimating a power consumption of a gate-level implementation of an electronic device design, including independently calculating for each of a plurality of implementation-invariant nodes of said design an incremental power dissipation associated with that node,
   wherein said estimating uses an implementation module to produce a back-annotation database;
   wherein each of said plurality of nodes are either inputs or outputs of a design block of said electronic device and are invariant between differing gate-level implementations of said design block; and
   wherein said estimating is performed by a processing device.

2. The method as recited in claim 1, further comprising:
   receiving a design database of said electronic device design; and
   modifying said design database after said estimating to reduce said estimated power consumption.

3. The method as recited in claim 1, further comprising simulating signal activity at said plurality of implementation-invariant nodes of said electronic device design.

4. The method as recited in claim 3, wherein said estimating further includes disregarding simulation signal transitions that do not propagate in said electronic device design.

5. The method as recited in claim 1, further comprising performing a gate level simulation of said electronic device design after said estimating.

6. The method as recited in claim 2, wherein said estimating further comprises independently determining incremental power consumption of a plurality of logic cones within said design database.

7. The method as recited in claim 1, wherein said method is implemented as an application programming interface of an electronic design automation tool.

8. The method as recited in claim 2, further comprising executing a second power consumption estimate of said modified design database.

9. A computer program product, comprising a non-transitory computer readable medium having a series of operating instructions embodied therein, said series of operating instructions adapted to be executed by a processing device to implement a method of estimating power consumption of an electronic device, the method comprising:
   estimating a power consumption of a gate-level implementation of an electronic device design, including independently calculating for each of a plurality of implementation-invariant nodes of said design an incremental power dissipation associated with that node, wherein said estimating uses an implementation module to produce a back-annotation database and wherein each of said plurality of nodes are either inputs or outputs of a design block of said electronic device and are invariant between differing gate-level implementations of said design block.

10. The computer program product as recited in claim 9, wherein said method further comprises:
    receiving a design database of said electronic device design; and modifying said design database after said estimating to reduce said estimated power consumption.

11. The computer program product as recited in claim 9, wherein said estimating includes simulating signal activity at said plurality of implementation-invariant nodes of said electronic device design.

12. The computer program product as recited in claim 11, wherein said estimating further includes disregarding simulation signal transitions that do not propagate in said electronic device design.

13. The computer program product as recited in claim 9, wherein said method further comprises performing a gate level simulation of said electronic device design after said estimating.

14. The computer program product as recited in claim 10, wherein said estimating further comprises independently determining incremental power consumption of a plurality of logic cones within said design database.

15. The computer program product as recited in claim 9, wherein said method is implemented as an application programming interface of an electronic design automation tool.

16. The computer program product as recited in claim 10, wherein said method further comprises executing a second power consumption estimate of said modified design database.

17. An electronic device design power estimation system, comprising:
   an electronic design automation tool; and
   a power estimation module configured to:
      receive from said electronic design automation tool an electronic device design; and
      estimate a power consumption of a gate-level implementation of said design, including independently calculating for each of a plurality of implementation-invariant nodes of said design an incremental power dissipation associated with that node, wherein said estimating uses an implementation module to produce a back-annotation database and wherein each of said plurality of nodes are either inputs or outputs of a design block of said electronic device and are invariant between differing gate-level implementations of said design block.

18. The system as recited in claim 17, wherein said power estimation module is further configured to:
   receive a design database of said electronic device design; and
   modify said design database after said estimating to reduce said estimated power consumption.

19. The system as recited in claim 17, wherein said estimating includes simulating signal activity at said plurality of implementation-invariant nodes of said electronic device design.

20. The system as recited in claim 19, wherein said estimating further includes disregarding simulation signal transitions that do not propagate in said electronic device design.

21. The system as recited in claim 17, wherein said power estimation module is further configured to perform a gate level simulation of said electronic device design after said estimating.

22. The system as recited in claim 18, wherein said estimating further includes independently determining incremental power consumption of a plurality of logic cones within said design database.

23. The system as recited in claim 17, wherein said power estimation module is implemented as an application programming interface of an electronic design automation tool.

24. The system as recited in claim 18, wherein said estimate further includes executing a second power consumption estimate of said modified design database.

* * * * *